United States Patent
Taketa et al.

(10) Patent No.: US 11,326,464 B2
(45) Date of Patent: May 10, 2022

(54) GAS TURBINE ENGINE VANE END DEVICES

(71) Applicants: Rolls-Royce North American Technologies Inc., Indianapolis, IN (US); Rolls-Royce Corporation, Indianapolis, IN (US)

(72) Inventors: Linnea Taketa, Indianapolis, IN (US); John Munson, Indianapolis, IN (US); Ted J. Freeman, Danville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 238 days.

(21) Appl. No.: 16/453,438

(22) Filed: Jun. 26, 2019

(65) Prior Publication Data
US 2019/0330993 A1    Oct. 31, 2019

Related U.S. Application Data

(62) Division of application No. 15/824,467, filed on Nov. 28, 2017, now Pat. No. 10,370,995, which is a
(Continued)

(51) Int. Cl.
*F01D 11/00* (2006.01)
*F01D 17/16* (2006.01)
(Continued)

(52) U.S. Cl.
CPC .............. *F01D 11/005* (2013.01); *F01D 5/28* (2013.01); *F01D 9/041* (2013.01); *F01D 11/00* (2013.01);
(Continued)

(58) Field of Classification Search
CPC ...... F01D 17/16; F01D 17/162; F01D 17/165; F01D 17/148; F01D 11/005; F01D 11/00;
(Continued)

(56) References Cited

U.S. PATENT DOCUMENTS 3,117,716 A    1/1964    Wernicke
4,169,692 A    10/1979   McDonough et al.
(Continued)

FOREIGN PATENT DOCUMENTS

EP    1582700 A2    10/2005
EP    2037083 A2    3/2009
WO    2011090701 A2    7/2017

*Primary Examiner* — Christopher Verdier
(74) *Attorney, Agent, or Firm* — Barnes & Thornburg LLP

(57) ABSTRACT

A turbomachinery component of a gas turbine engine is disclosed having a number of techniques of reducing the effects of a gap flow between an airfoil member of the gas turbine engine and a wall of the gas turbine engine. The airfoil member can be variable and in one form is a variable turbine vane. In one embodiment a brush seal is included between the vane and the wall. In another form a wear surface is disposed between the vane and the wall. In yet another form a moveable member capable of being actuated to change position can be disposed between the vane and the wall to alter the size of a gap between the two.

18 Claims, 4 Drawing Sheets

Related U.S. Application Data division of application No. 14/132,738, filed on Dec. 18, 2013, now Pat. No. 9,938,845.

(60) Provisional application No. 61/769,535, filed on Feb. 26, 2013.

(51) Int. Cl.

| | |
|---|---|
| *F04D 27/02* | (2006.01) |
| *F04D 19/02* | (2006.01) |
| *F04D 29/16* | (2006.01) |
| *F01D 5/28* | (2006.01) |
| *F01D 9/04* | (2006.01) |
| *F01D 11/02* | (2006.01) |
| *F01D 17/14* | (2006.01) |
| *F16J 15/3288* | (2016.01) |
| *F04D 29/08* | (2006.01) |
| *F04D 27/00* | (2006.01) |
| *F01D 11/12* | (2006.01) |

(52) U.S. Cl.
CPC ............ *F01D 11/02* (2013.01); *F01D 11/025* (2013.01); *F01D 17/148* (2013.01); *F01D 17/162* (2013.01); *F01D 17/165* (2013.01); *F04D 19/02* (2013.01); *F04D 27/0246* (2013.01); *F04D 29/164* (2013.01); *F01D 11/122* (2013.01); *F04D 27/002* (2013.01); *F04D 29/083* (2013.01); *F05B 2240/571* (2013.01); *F05D 2240/56* (2013.01); *F16J 15/3288* (2013.01)

(58) Field of Classification Search
CPC ...... F01D 11/12; F01D 11/122; F01D 11/125; F01D 11/127; F01D 5/20; F04D 29/563; F04D 27/0246; F04D 27/002; F04D 29/164; F05D 2240/55
USPC .......................... 415/148, 150, 151, 159–166
See application file for complete search history.

(56) References Cited

U.S. PATENT DOCUMENTS

| | | | |
|---|---|---|---|
| 4,193,738 A | 3/1980 | Haap et al. | |
| 4,285,634 A | 8/1981 | Rossman et al. | |
| 5,201,530 A | 4/1993 | Kelch et al. | |
| 5,342,165 A | 8/1994 | Graef et al. | |
| 5,752,802 A | 5/1998 | Jones | |
| 5,752,805 A | 5/1998 | Gail et al. | |
| 5,822,852 A * | 10/1998 | Bewlay | C30B 11/00 29/889.1 |
| 6,179,556 B1 * | 1/2001 | Bunker | F01D 5/187 415/115 |
| 6,210,106 B1 | 4/2001 | Hawkins | |
| 6,536,773 B2 | 3/2003 | Datta | |
| 6,558,119 B2 * | 5/2003 | Lee | B23P 6/005 416/97 R |
| 6,808,364 B2 | 10/2004 | O'Reilly et al. | |
| 6,915,574 B2 | 7/2005 | Mesing et al. | |
| 7,163,369 B2 | 1/2007 | Bruce | |
| 7,410,173 B2 | 8/2008 | Justak | |
| 7,445,427 B2 | 11/2008 | Gutknecht et al. | |
| 7,473,073 B1 | 1/2009 | Liang | |
| 7,549,841 B1 | 6/2009 | Marussich | |
| 7,607,893 B2 | 10/2009 | Lee et al. | |
| 2003/0227174 A1 | 12/2003 | Bayly | |
| 2005/0008481 A1 | 1/2005 | Nottin | |
| 2005/0175447 A1 | 8/2005 | Gamer | |
| 2007/0160463 A1 | 7/2007 | Jahns | |
| 2008/0237403 A1 * | 10/2008 | Kelly | B22F 5/04 244/34 A |
| 2009/0074563 A1 | 3/2009 | McCaffrey et al. | |
| 2009/0238682 A1 | 9/2009 | Clemen | |
| 2010/0266408 A1 | 10/2010 | Dawson et al. | |
| 2011/0158793 A1 * | 6/2011 | Fritsch | F01D 9/02 415/170.1 |
| 2011/0255990 A1 * | 10/2011 | Diamond | F01D 5/20 416/97 R |
| 2013/0195633 A1 | 8/2013 | Hildebrand et al. | |
| 2013/0277918 A1 | 10/2013 | Fitzgerald et al. | |

* cited by examiner

GAS TURBINE ENGINE VANE END DEVICES

CROSS REFERENCE TO RELATED APPLICATIONS

This application is a divisional of pending U.S. application Ser. No. 15/824,467, filed 28 Nov. 2017, which was a divisional of U.S. application Ser. No. 14/132,738, filed 18 Dec. 2013, which in turn claimed priority to and the benefit of U.S. Provisional Patent Application No. 61/769,535, filed 26 Feb. 2013, the disclosures of which are now expressly incorporated herein by reference.

GOVERNMENT RIGHTS

The present application was made with the United States government support under Contract No. FA8650-07-6-2803. The United States government has certain rights in the present application.

TECHNICAL FIELD

The present invention generally relates to moveable flow structures in gas turbine engines, and more particularly, but not exclusively, to gap flows in gas turbine engines.

BACKGROUND

Mitigating and/or reducing a flow of fluid between an end of a movable airfoil member in a gas turbine engine and an adjacent wall remains an area of interest. Some existing systems have various shortcomings relative to certain applications. Accordingly, there remains a need for further contributions in this area of technology.

SUMMARY

One embodiment of the present invention is a unique gas turbine engine moveable airfoil member. Other embodiments include apparatuses, systems, devices, hardware, methods, and combinations for discouraging flow between an end of a variable vane and a wall of a gas turbine engine. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
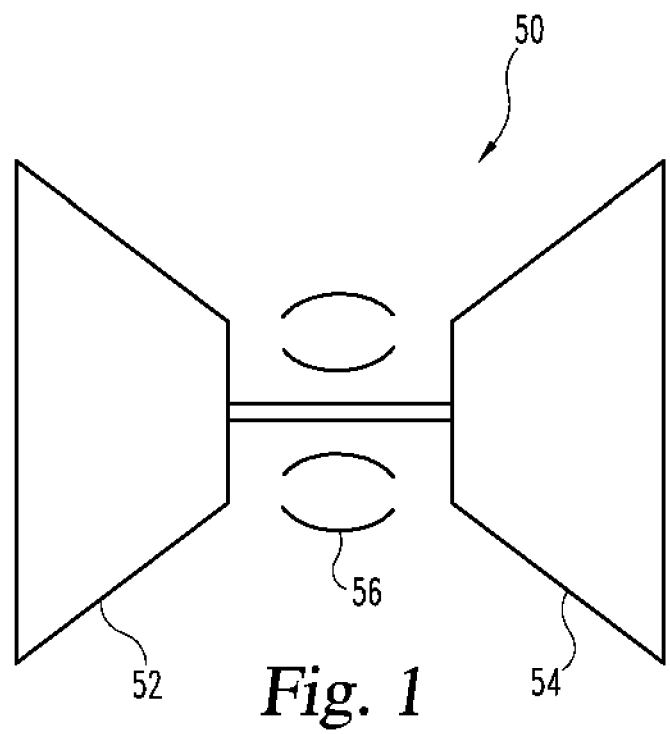
FIG. 1 depicts an embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment of a gas turbine engine 50 is depicted which includes turbomachinery components such as a compressor 52 and turbine 54 which operate to produce power. In operation the gas turbine engine 50 produces power by receiving a working fluid into the compressor 52 and compressing, mixing the working fluid with a fuel and combusting the mixture in a combustor 56. The working fluid and/or products of combustion can be expanded in the turbine 54 to produce work before being exhausted downstream of the turbine 54. The turbomachinery of the engine 50 generally includes a rotating bladed rotor, or like device, capable of turning at relatively high speed as a working fluid is passed through the turbomachinery. The gas turbine engine components can also include one or more row of vanes that can be used to turn a fluid flow either upstream or downstream of the bladed rotor. For example, the turbine 54 can include a row of vanes to assist in turning the flow upstream of a row of rotating blades. The vanes can be selectively turned, or pivoted, to change the amount of flow turning upstream of the blades. The gas turbine engine can have any number of blade rows and vane rows depending on the application. Though the vanes can be located immediately upstream of a row of rotatable blades it will be appreciated that the vanes can be placed in other locations, whether or not immediately adjacent upstream of the blades. To set forth just one non-limiting example, the vanes can be an inlet guide vane or an outlet guide vane. The vanes can also be positioned downstream of the rotatable row of blades. Various configurations are contemplated herein.

Though the gas turbine engine 50 is depicted in the illustrated embodiment as a single spool engine, in other embodiments the gas turbine engine can include any number of spools. The gas turbine engine 50 can take on a variety of forms including a turbojet, turbofan, turboshaft, and turboprop engine. In some forms the gas turbine engine 50 can be a variable cycle and/or adaptive cycle engine. In one non-limiting form the gas turbine engine 50 can be used to provide power to an aircraft whether that power is in the form of propulsive thrust, mechanical power, electrical power, or otherwise.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2A:
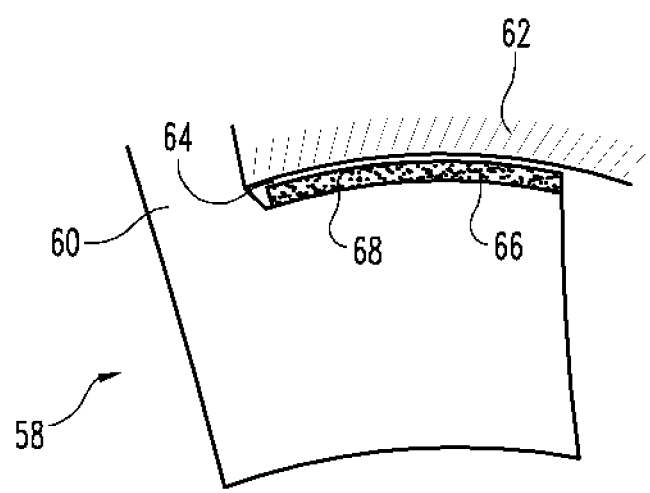
FIG. 2a depicts an embodiment of a brush seal.
Figure 2B:
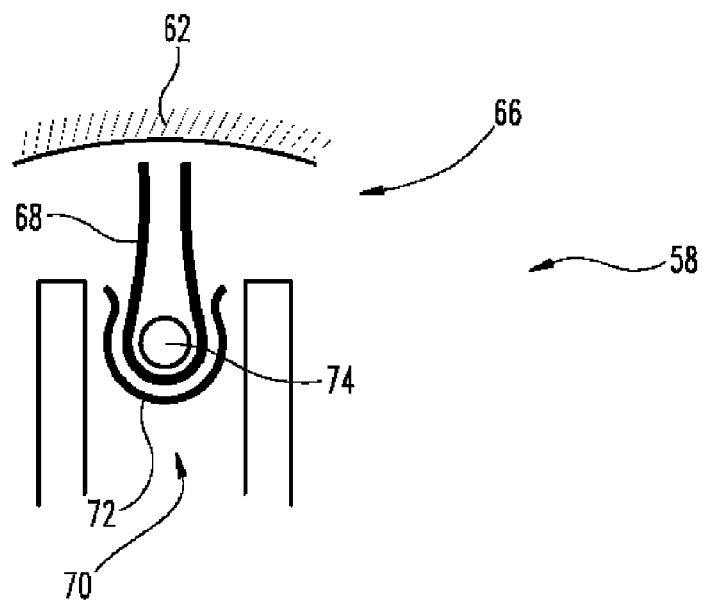
FIG. 2b depicts an embodiment of a brush seal.

Turning to FIGS. 2a and 2b, one embodiment of a turbomachinery component in the form of a vane 58 is depicted having a seal disposed at one end. The vane 58 includes a spindle 60 that can be coupled with an actuation mechanism and used to change a position of the vane 58. For example, the spindle 60 can be coupled directly to an actuator or alternatively can be coupled to an actuator via a common sync ring shared by a number of other vanes 58.

The spindle 60 or other suitable structure can be used to support the vane 58 within the flow path of the gas turbine engine such that the vane 58 is cantilevered. In some forms the vane 58 can be supported on both ends of its span. In the illustrated embodiment the vane 58 is shown supported on one end but it will be appreciated that different embodiments may include other variations. The vane 58 can be one of a plurality of variable vanes 58 in a row, all of which can be actuated to change a position to redirect a flow of working fluid through the turbomachinery component. The vane 58 is generally disposed between walls that define a flow path of the gas turbine engine. As shown in the illustrated embodiment the vane 58 is positioned adjacent a wall 62. Though a corresponding wall is not depicted in FIGS. 2a and 2b it will be appreciated that the other wall is in proximity to the opposing side of the vane 58.

The wall 62 of the turbomachinery component is generally non-planar in many embodiments and thus certain embodiments of the vane 58, when pivoted to various positions, creates a gap between the wall 62 and a portion of the vane sometimes referred to as an overhang 64 of the vane 58. The overhang 64 can be designed to permit a movement of the vane 58 such that little to no interaction occurs between the wall 62 and the vane 58. In some forms the vane 58 can be rotated to positions which create contact with the wall 62 of the turbomachinery component. To set forth just one non-limiting example, the overhang 64 may contact the wall of the turbomachinery component at either or both the maximum position and the minimum position thus creating a gap over the portion of vane travel between one or both of the maximum position and minimum position. In any event, the gap between the vane 58 and the wall 62 can be created at some positions of the vane 58 when pivoted and may disappear at other positions when the vane 58 contacts the wall 62. The size of the gap can be the same size along the length of the vane 58, but in some forms the size of the gap can vary depending on the chord location. For example, near a trailing edge of the vane 58 the gap can be larger than at a location nearer a leading edge of the vane 58. Though the illustrated embodiment is depicted having just one wall 62, it will be appreciated that a gap can be formed between the vane 58 and a wall opposing the wall 62. Such a gap can have the same characteristics as the gap discussed above with respect to the vane 58 and wall 62, but some embodiments may include variations between the gaps.

A seal 66 can located between the vane 58 and the wall 62 to discourage a flow of working fluid from one side of the vane to the other, for example from a relatively high pressure side to a relatively low pressure size. In the illustrated embodiment the seal extends from the vane 58 and is in the form of a brush seal having a number of bristles 68 located along a portion of the chord of the vane 58. The bristles 68 can contact the wall 62 at all positions of the vane 58, but in some embodiments one or more portions of the bristles 68 may not contact the wall 62 at all positions. The brush seal 66 can include one or more bristles 68 that are flexible such that when contact is made with the wall 62 the bristles 68 will flex. The flexible nature of the bristles 68 can permit some degree of variation in the gap between the end of the vane 58 and the wall 62 as the vane 58 is rotated to new positions. For example the bristles 68 can flex greater amounts at a position where the gap is small and flex relatively little where the gap is large. The bristles 68 can be made of a variety of materials using a variety of processes. In one non-limiting form the bristles 68 are made of ceramic fiber.

In some embodiments the seal 66 can extend along the entirety of the chord of the vane 58. For example, the brush seal 66 can extend between a leading edge and a trailing edge and be located on both sides of the spindle 60. In some forms the brush seal 66 can be grouped into separate portions. Other variations are contemplated. A brush seal 66 can also be located on the opposite end of the vane 58, though the illustrated embodiment depicts a brush seal on just one end of the vane 58. In those embodiments having brush seals 66 disposed on both ends of the vane 58, the seals 66 can be arranged similarly but in some forms the seals 66 can have different configurations.

The height of the bristles 68 in the brush seal 66 can vary. In one non-limiting form the reach of the bristles 68 between the vane 58 and the wall 62 can vary with chord location. For example, the bristles 68 can be relatively short near the leading edge and relatively long near the trailing edge. Additionally and/or alternatively, the bristles 68 can vary individually regardless of chord location such as variations in bristles that are located near the same chord location.

The brush seal 66 can include groupings of bristles 68. For example, the brush seal 66 can include one grouping disposed toward the suction side and another grouping disposed toward the pressure side of the vane. Additional or fewer groupings can be used in other embodiments. Other variations are also contemplated herein.

FIGS. 2a and 2b depict just one embodiment of the bristles 68 and a mechanism 70 to couple the bristles 68 to the vane 58. The mechanism 70 includes a clamp 72 and a base member 74 around which the bristles 68 are coupled. The clamp 72 is used in the illustrated embodiment to retain the bristles 68 to the base member 74. One or more clamps 72 can be used though the illustrated embodiment depicts just one clamp 72. The clamp 72 can be metallic and in some applications takes the form of a crimp. In some embodiments the mechanism 70 can include bristles 68 that are bonded or affixed to the base member 74 using techniques other than the clamp 72. Other mechanisms are contemplated herein. To set forth just one non-limiting example, the bristles 68 can be individually attached to a base such that they are not wound around a member, such as the base member 74, but rather extend from an attachment.

The base member 74 in the illustrated embodiment includes a circular cross section but other cross sections are contemplated. The member 74 can extend along the chord of the vane 58 a variety of lengths. In some forms the member 74 can be formed integral with the vane 58 while in other forms the member 74 can be coupled to the vane 58 using a variety of techniques. In some forms the base member 74 need not be straight but can rather take on other shapes. Any number of base members 74 can be used.

The base member 74 around which the bristles 68 are coupled can be oriented parallel with an end of the vane 58. In some embodiments the base member 74 can be oriented at an angle whether that angle is measured relative to the vane 58 or relative to the wall 62 when the vane 58 is positioned within the flow path of the gas turbine engine 50. To set forth just one non-limiting example, the base member 74 can be oriented such that a portion located toward the leading edge of the vane 58 is positioned further away from an end of the vane 58 than a portion of the base member 74 located toward the trailing edge.

Figure 3:
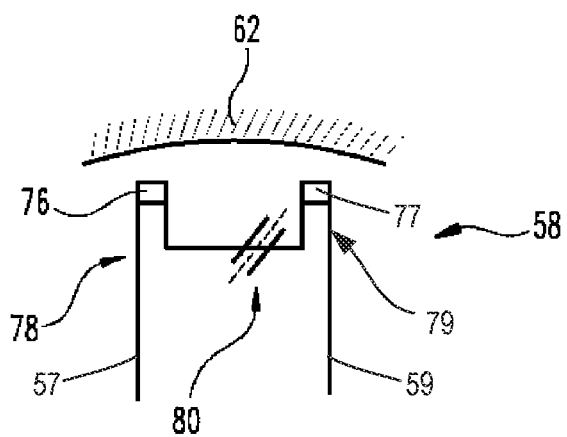
FIG. 3 depicts an embodiment of a wear surface.

Turning now to FIG. 3, another embodiment of the vane 58 is disclosed which includes two wear surfaces 76, 77 disposed between the vane 58 and the wall 62. In one form the wear surfaces 76, 77 are configured to be abraded when relative movement causes the vane 58 and the wall 62 to contact each other. The wear surfaces 76, 77 are shown disposed on the tips of squealer members 78, 79 of the vane 58, but in some forms of the vane 58 the wear surfaces 76, 77 can be located at the end of the vane 58 whether or not the vane includes the squealer members 78, 79. Both ends of the vane 58 can include the wear surfaces 76, 77, whether or not both ends also include the squealer members 78, 79. The wear surfaces 76, 77 can be a coating that is applied to the vane 58 using any number of processes. The wear surfaces 76, 77 can be configured to provide for variable wear rates and in some forms is made of a different material than the vane 58. In some forms the wear surfaces 76, 77 can therefore have different material properties, such as density among potential others.

Figure 3A:
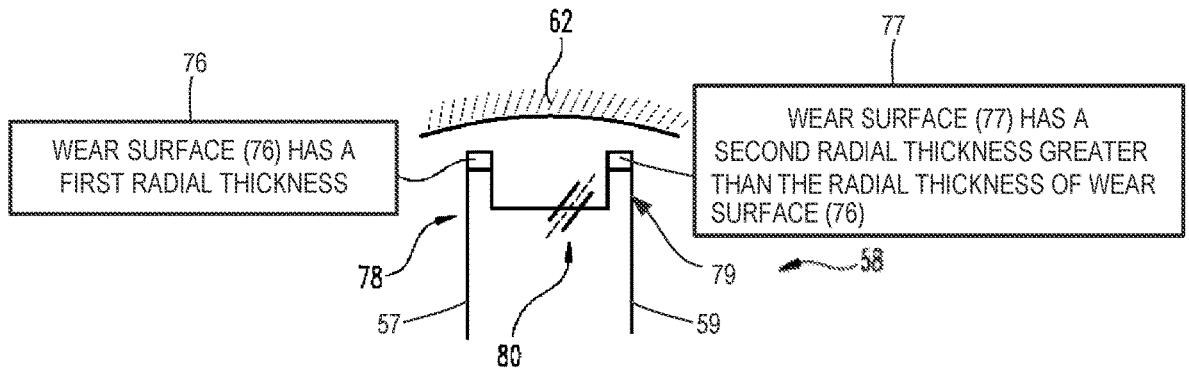
FIG. 3a depicts another embodiment of a wear surface.
Figure 3B:
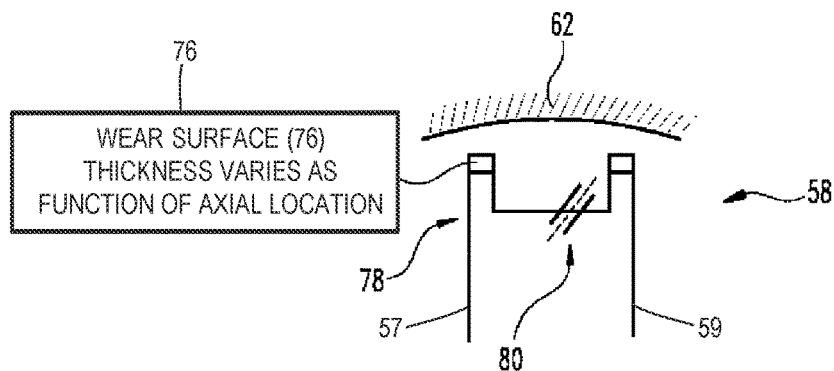
FIG. 3b depicts another embodiment of a wear surface.

The wear surfaces 76, 77 can be used to allow for geometric variations in the contact points between the vane 58 and the coating. For example, the wear surfaces 76, 77 may wear more heavily at a point between a leading edge 57 and a trailing edge 59 of the vane 58. In some applications a side of either of the wear surfaces 76, 77 disposed toward one of the pressure side and suction side of the vane 58 may wear more than another side. For example, a squealer member 78 disposed on a pressure side of the vane 58 may experience greater wear of its wear surface 76 than the squealer member 79 disposed toward the suction side of the vane 58. It is also possible that one edge of either of the squealer members 78, 79 can provide for a greater wear than another edge of the same squealer member. The wear surfaces 76, 77 may have a variety of thicknesses which can change with its relative location in the vane 58. For example, there may be one wear surface 76 which may be thicker near the trailing edge 59 than that near the leading edge 57 of the vane 58, as shown in FIG. 3b. One squealer member 78 can also have a thicker wear surface 77 than the wear surface 76 of another squealer member 78, as shown in FIG. 3a.

Figure 3C:
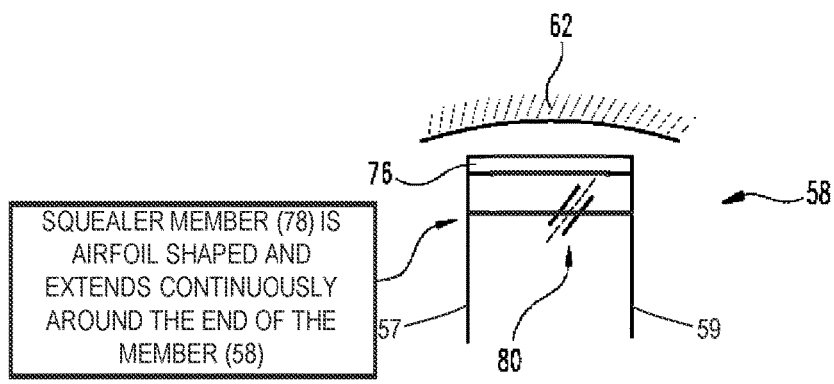
FIG. 3c depicts another embodiment of a wear surface.

The squealer members 78, 79 can be integral to the vane 58, but in some forms the squealer members 78, 79 can be coupled with the vane 58. Though two squealer members 78, 79 are shown, in some embodiments the vane 58 can include fewer or greater numbers of squealer members 78, 79. The squealer members 78, 79 can have a variety of shapes and sizes. For example, as shown in FIG. 3c, in one non-limiting example a squealer member 78 can continuously extend around the vane 58 and have the shape of an airfoil. The squealer members 78, 79 can also have a variety of shapes upon which the wear surfaces 76, 77 are applied. In some forms the wear surfaces 76, 77 are applied as a coating upon a shape of the tip of the squealer members 78, 79 that is in the form of a relatively flat shelf. In some forms the material that constitutes the wear surfaces 76,77 constitutes a majority of the squealer members 78, 79. In other forms the material forming the wear surfaces 76, 77 is the entirety of the members 78, 79.

In the illustrated form a cooling hole 80 is included the vane 58, but not all embodiments need include the cooling hole 80. In one form the cooling hole is an effusion hole. The cooling hole 80 can be oriented at an angle, as depicted, or can be normal to a surface of the vane 58 and can be capable of flowing a cooling flow at a variety of flow rates, pressures, and temperatures. Multiple cooling holes 80 can be included in some forms of the vane 58.

Figure 4A:
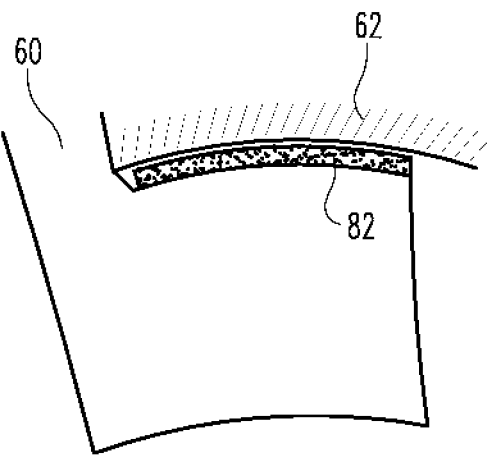
FIG. 4a depicts an embodiment of a moveable member.
Figure 4B:
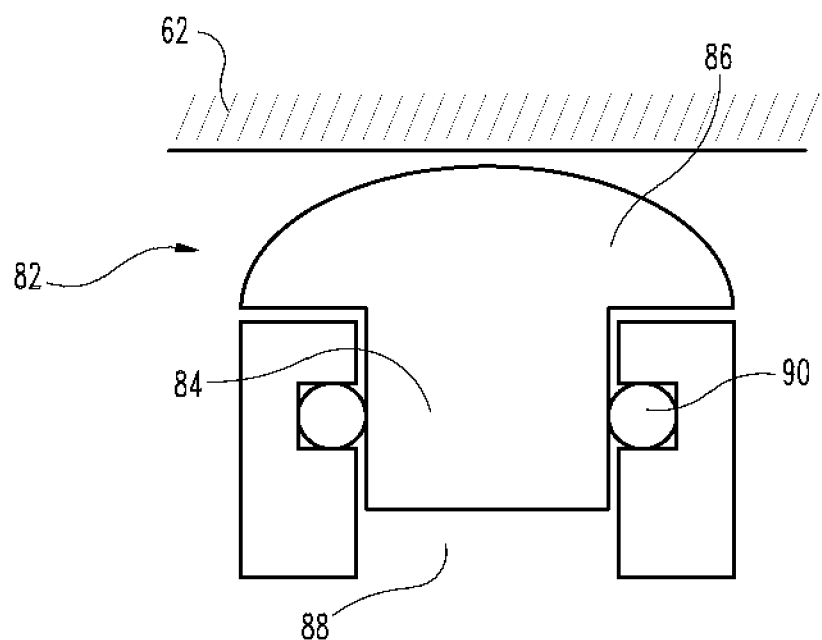
FIG. 4b depicts an embodiment of a moveable member.

FIGS. 4a and 4b disclose yet another embodiment of the vane 58 which includes a moveable member 82 that can be used to modulate and/or close the size of the gap between the vane 58 and the wall 62. In the illustrated form the moveable member 82 includes a piston 84 received within the vane 58 and which includes a head 86 capable of being placed into contact with the wall 62. Other forms of moveable members are also contemplated to modulate and/or close the size of the gap between the vane 58 and wall 62. In some embodiments the shape of the piston may ensure contact between the wall 62 and the vane 58 over the desired range of motion of the vane 58. For example, the shape of an end of the piston can be curvilinear to accommodate interaction with the wall 62. The degree to which the piston shape is curved can be dependent on a particular chord location. The piston can take on other shapes. In operation of the illustrated embodiment a relative pressure difference between an interior 88 of the vane 58 and an exterior of the vane 58, such as the flow path of the gas turbine engine 50, can be used to manipulate a location of the moveable member 82. The relative pressure difference can be modulated using suitable sensors and controls to change the position of the piston. In some forms the pressure can be modulated to selectively engage the piston with the wall 62. To set forth just one non-limiting example, the pressure can be modulated to ensure contact of the piston with the wall 62 over a range of vane positions.

Though the illustrated embodiment depicts a single moveable member 82 disposed on one end of the vane 58, other embodiments can include moveable members 82 at both ends of the vane 58. Alternatively and/or additionally, more than one moveable member 82 can be disposed at any given end of the vane 58. In embodiments having moveable members 82 at both ends of the vane 58, each of the moveable members 82 can be configured independent of the other. To set forth just a few non-limiting examples, the shape and size of the moveable members 82 can be different. The moveable members 82 can be independently or dependently moveable relative to the other.

The piston head 86 is configured in the illustrated embodiment to extend to the sides of the vane 58. In some forms the piston head 86 may extend out of the interior 88 and not include a portion that extends to one or more of the sides of the vane 58. The piston head 86 may also extend to one or more sides of the vane depending on its chord location. For example, in one non-limiting example the piston head 86 may extend to the sides at a location near a leading edge of the vane 58 but may not extend to the sides of the vane 58 near the trailing edge of the vane 58. A variety of configurations are contemplated herein.

The shape and size of the piston head 86 can be different depending on location in the vane 58. For example, the piston head 86 may have a larger thickness between sides of the vane 58 but relatively smaller height as it extends from the vane at a location near the leading edge of the vane 58, while also having a relatively smaller thickness but larger height near the trailing edge of the vane 58.

A seal 90 is disposed between the piston 86 and the vane 58 and is used to discourage a flow of working fluid between the interior 88 of the vane 58 and the flow path of the gas turbine engine. The working fluid can take a variety of forms and in one non-limiting embodiment is a working fluid from the compressor 52 of the gas turbine engine. The seal 90 can take a variety of forms and can include one or more individual seals. In some applications the seal 90 can extend around the periphery of the piston 84 while in other forms the seal 90 may extend around only part of the periphery of the piston 84. Such applications may include additional seals to extend the remainder, or partial remainder around the piston 86. In other forms additional seals can be located at other span locations of the vane 58.

The seal 90 can be formed from a variety of materials using a number of different processed. To set forth just a few non-limiting examples of material type, the seal 90 can be made from ceramic or can be metallic. In one non-limiting example, the seal 90 can be a rope seal. The seal 90 can be constructed such that it can expand to engage the piston 84. In some forms the seal 90 can expand to form a relatively secure fit to substantially discourage working fluid from traversing the seal. The seal 90 can expand upon heating and/or may expand as a result of being compressed during an assembly process of the vane 58.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a rotatable airfoil member for a gas turbine engine having an end structured to contact a wall of the gas turbine engine, the end having an abradable coating configured to wear according to a contact between the abradable coating and the wall of the gas turbine engine,
wherein the rotatable airfoil member is disposed adjacent a rotatable blade and the rotatable airfoil member is configured to turn a working fluid, the rotatable blade configured to rotate around a central axis of the gas turbine engine, and the rotatable airfoil member is rotatable about a rotation axis that extends perpendicularly from the central axis,
wherein the end of the rotatable airfoil member defines two squealer tips integrally formed with the rotatable airfoil member such that the two squealer tips are blocked from moving radially relative to the rotatable airfoil member, the two squealer tips spaced apart from each other, wherein the abradable coating is applied to a radial outer tip of each of the two squealer tips, and the two squealer tips engage the wall of the gas turbine engine, and
wherein the rotatable airfoil member is a turbine vane, and the turbine vane includes a cooling hole disposed between the two squealer tips.

2. The apparatus of claim 1, wherein one of the two squealer tips is disposed toward a relatively low pressure side of the vane and the other of the two squealer tips is disposed toward a relatively high pressure side of the vane.

3. The apparatus of claim 1, wherein the abradable coating is made of a first material and the end of the vane is made of a second material.

4. The apparatus of claim 3, wherein the first material is different than the second material.

5. The apparatus of claim 3, wherein a density of the first material is different than a density of the second material.

6. An apparatus comprising:
a rotatable airfoil member for a gas turbine engine, the rotatable airfoil member having a first end and a second end spaced apart radially from the first end relative to a central axis of the gas turbine engine such that the rotatable airfoil member extends radially relative to the central axis, the first end of the rotatable airfoil member formed to include a first squealer member that is integrally formed with the first end so that the first squealer member is blocked from moving radially relative to the first end, and wherein the first squealer member extends radially outward away from the first end relative to the central axis, the rotatable airfoil member configured to rotate about a rotation axis that extends radially through the rotatable airfoil member, and the rotation axis is perpendicular to the central axis; and
a wall arranged circumferentially around the first end of the rotatable airfoil member relative to the central axis;
wherein the rotatable airfoil member further includes a first wear surface disposed on a radial terminating tip of the first squealer member, the first wear surface configured to engage the wall in response to the rotatable airfoil member rotating about the rotation axis, and the first wear surface is configured to be abraded when relative movement between the rotatable airfoil member and the wall causes the rotatable airfoil member and the wall to contact each other.

7. The apparatus of claim 6, wherein the rotatable airfoil member includes a leading edge and a trailing edge spaced apart axially from the leading edge relative to the central axis and the first squealer member is located at the leading edge of the rotatable airfoil member.

8. The apparatus of claim 7, wherein the rotatable airfoil member is formed to include a cooling hole formed in the first end of the rotatable airfoil member.

9. The apparatus of claim 8, wherein the rotatable airfoil member includes a second squealer member and a second wear surface disposed on the second squealer member and the second squealer member is spaced apart from the first squealer member to locate the cooling hole between the first squealer member and the second squealer member.

10. The apparatus of claim 9, wherein the first wear surface has a first radial thickness and the second wear surface has a second radial thickness that is different than the first radial thickness.

11. The apparatus of claim 6, wherein the rotatable airfoil member includes a leading edge and a trailing edge spaced apart axially from the leading edge relative to the central axis and the first squealer member is located at the trailing edge of the rotatable airfoil member.

12. The apparatus of claim 6, wherein the rotatable airfoil member includes a leading edge and a trailing edge spaced apart axially from the leading edge relative to the central axis and a radial thickness of the first wear surface varies as a function of axial location of the first wear surface relative to the central axis.

13. The apparatus of claim 12, wherein the first wear surface is thicker near the trailing edge than that near the leading edge of the rotatable airfoil member.

14. The apparatus of claim 6, wherein the first squealer member is airfoil shaped and extends continuously around the first end of the rotatable airfoil member.

15. The apparatus of claim 6, wherein the rotatable airfoil member is made of a first material and the first wear layer is made of a second material that is different than the first material.

16. The apparatus of claim 6, wherein the first wear surface is formed from a material and an entirety of the first squealer member is formed from the material.

17. The apparatus of claim 6, wherein the rotatable airfoil member includes a second squealer member and a second wear surface disposed on the second squealer member, the first wear surface has a first radial thickness, and the second wear surface has a second radial thickness that is different than the first radial thickness.

18. The apparatus of claim 6, wherein the rotatable airfoil member includes a second squealer member spaced apart from the first squealer member, the rotatable airfoil member is a turbine vane, the turbine vane includes a cooling hole disposed between the first and second squealer members, and wherein the first squealer member is disposed toward a relatively low pressure side of the turbine vane and the second squealer member is disposed toward a relatively high pressure side of the turbine vane.

* * * * *